No. 858,658. PATENTED JULY 2, 1907.
W. P. KENNEDY.
BAGGAGE TRUCK.
APPLICATION FILED OCT. 18, 1906.
4 SHEETS—SHEET 1.
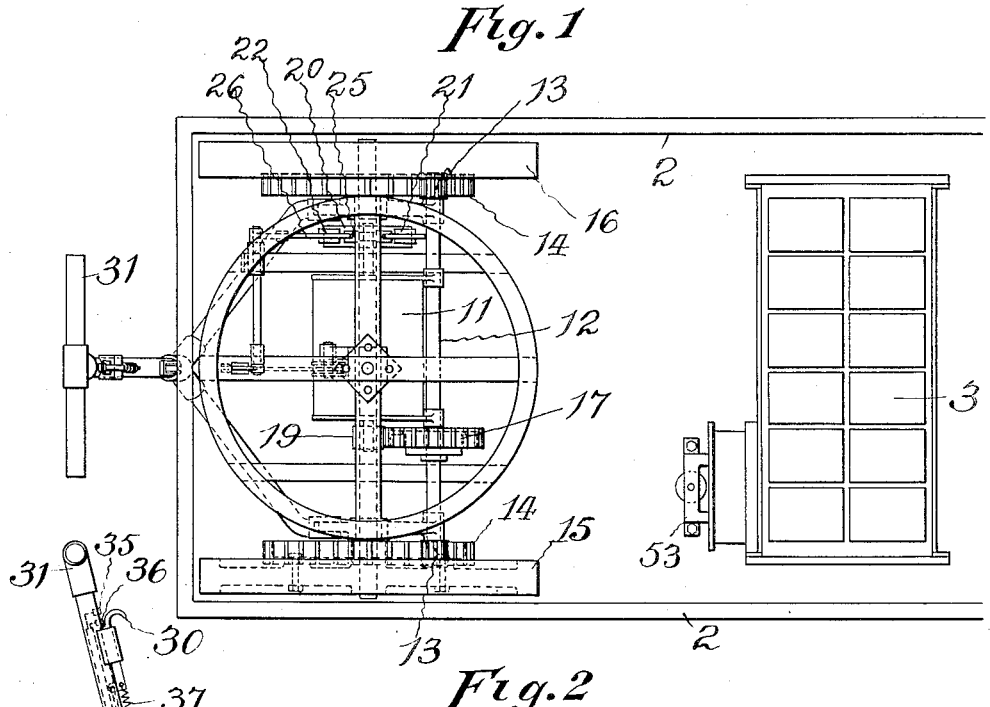
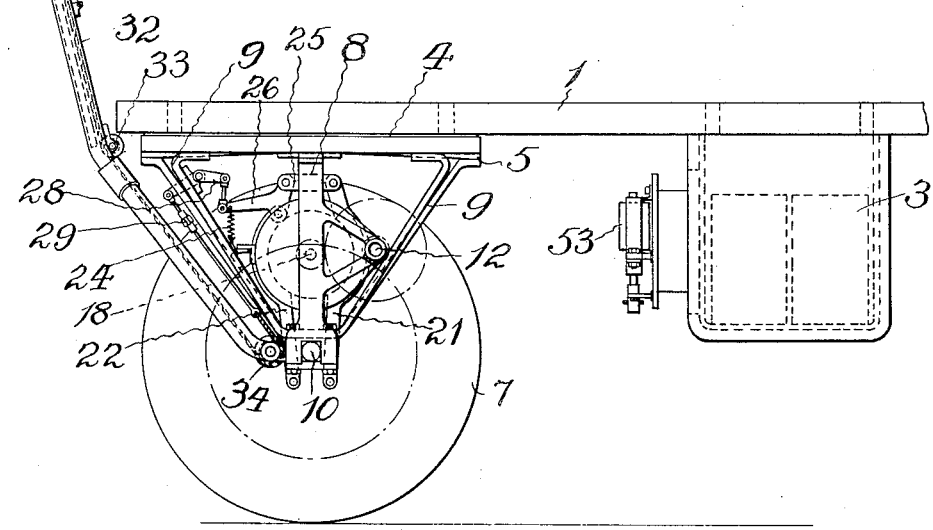
WITNESSES
Anna M. Stapleton
J. W. Millward
INVENTOR
William P. Kennedy
BY
ATTORNEY No. 858,658. PATENTED JULY 2, 1907.
W. P. KENNEDY.
BAGGAGE TRUCK.
APPLICATION FILED OCT. 18, 1906.
4 SHEETS—SHEET 3.
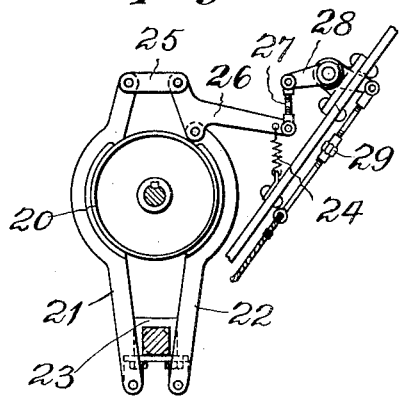
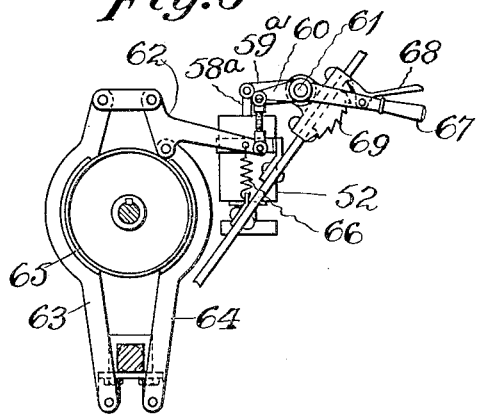
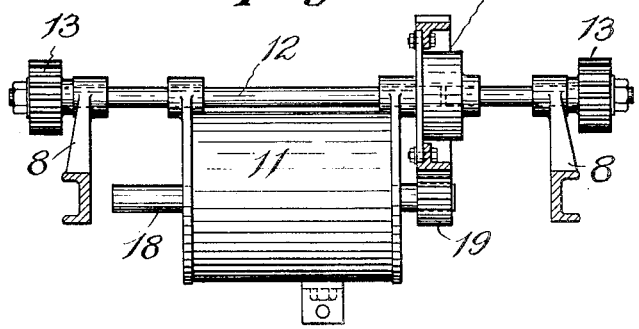
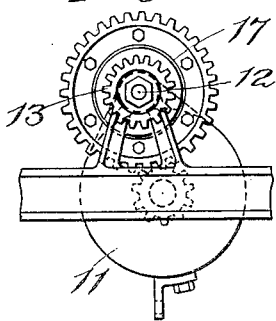
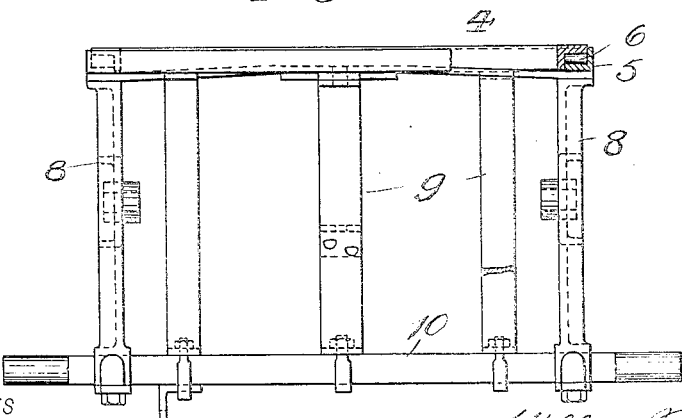
WITNESSES
Anna M. Stapleton
J. W. Millward.
INVENTOR
William P. Kennedy.
BY
C. W. Parker
ATTORNEY No. 858,658. PATENTED JULY 2, 1907.
W. P. KENNEDY.
BAGGAGE TRUCK.
APPLICATION FILED OCT. 18, 1906.

4 SHEETS—SHEET 4.

WITNESSES
Anna M. Stapleton
J. R. Millward.

INVENTOR
William P. Kennedy
BY
W. H. Parker
ATTORNEY

UNITED STATES PATENT OFFICE.

WILLIAM P. KENNEDY, OF NEW YORK, N. Y.

BAGGAGE-TRUCK.

No. 858,658.      Specification of Letters Patent.      Patented July 2, 1907.

Application filed October 18, 1906. Serial No. 339,444.

*To all whom it may concern:*

Be it known that I, WILLIAM P. KENNEDY, a citizen of the United States, and a resident of New York city, in the county of New York and State of New York, (whose post-office address is 1765 Broadway, New York city, N. Y.,) have invented certain new and useful Improvements in Baggage-Trucks, of which the following is a full, clear, and exact description, whereby any one skilled in the art may make and use the same.

The invention relates primarily to automobile trucks and more particularly to a type of truck commonly known as a "baggage or transfer truck". Heretofore, "baggage trucks" have been in common practice and are ordinarily provided with four wheels, two of which act as the steering-wheels and are controlled by a hand lever operated by an individual who guides the truck by pulling or pushing upon the handle dependent upon direction of movement of the truck. In such devices where they are heavily loaded, it is common practice for several operators to provide the necessary power for moving the vehicle by pushing against its rear end or sides, while another operator guides the truck through the handle and steering-wheels.

The object of the invention is to provide a truck of the type defined which will be absolutely within the control of a single operator and may be guided either forward or backward at his option.

A still further object is to provide a truck in which the controlling mechanism is so arranged that the operator may apply the necessary mechanical power for either forward or backward drive and, at the same time, have complete control of the movements of the vehicle through the controlling handle.

A still further object is to provide a truck in which there is a brake device normally in operation and which may be manually or automatically released upon the application of power to effect a drive of the vehicle.

Figure 3:
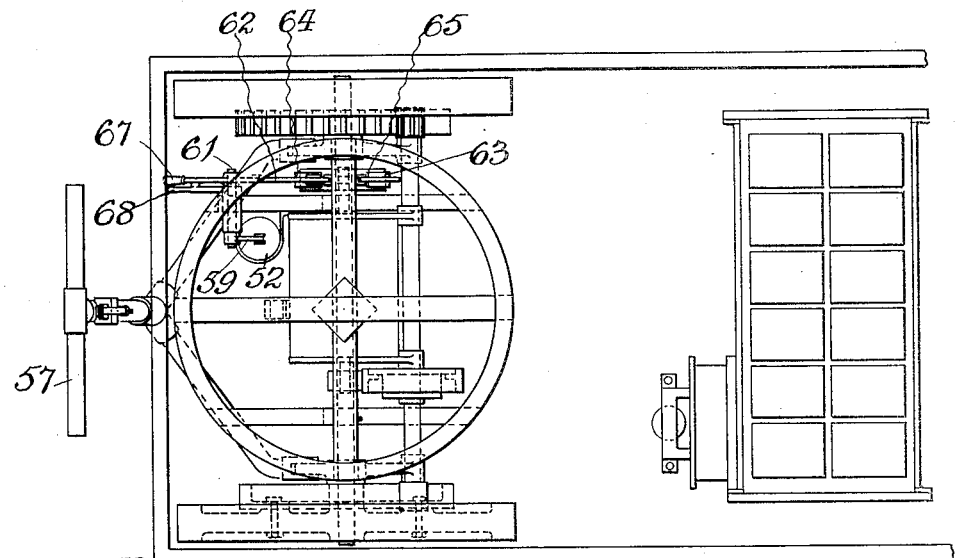
Figure 4:
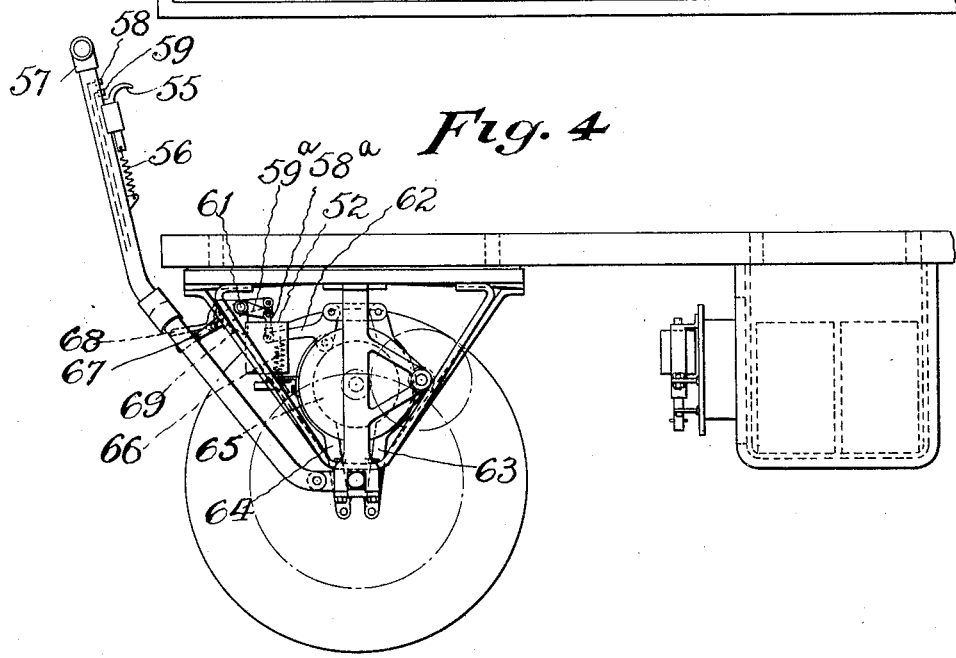
Figure 10:
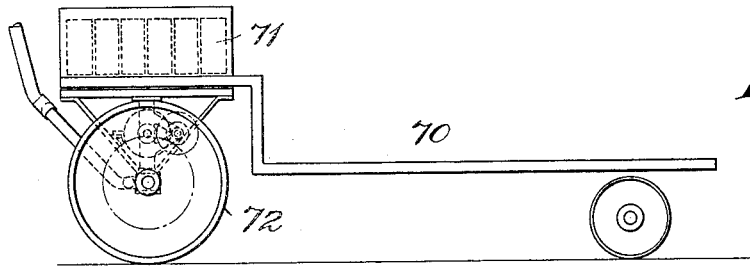
Figure 11:
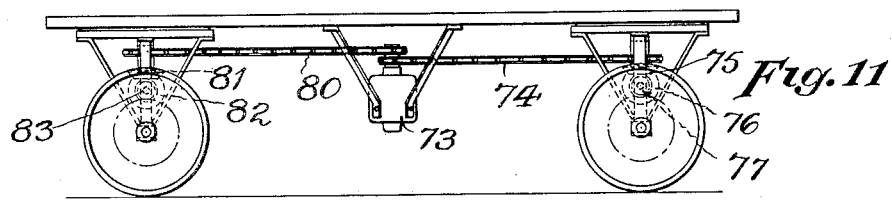
Figure 12:
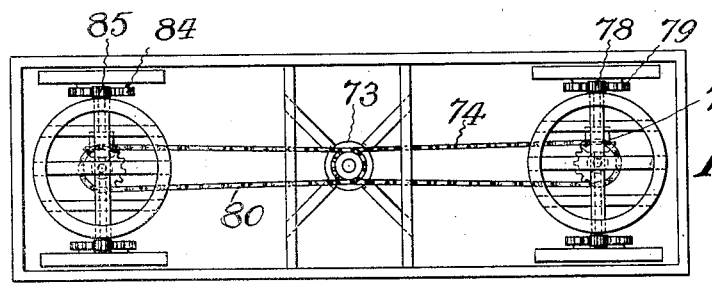
Figure 13:
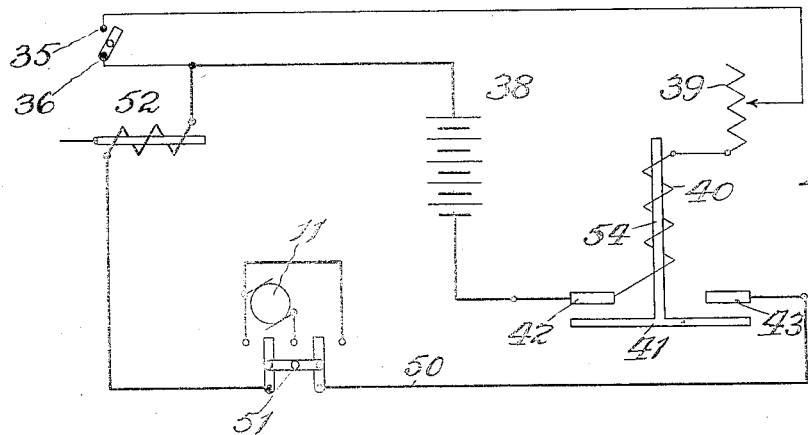

Referring to the drawings: Figure 1 is a plan view somewhat in diagram, of a truck illustrating the invention. Fig. 2 is a view in side elevation of the parts shown in Fig. 1. Fig. 3 illustrates the same device as shown in Figs. 1 and 2, but with a power controlled brake device. Fig. 4 is a view in side elevation of the parts shown in Fig. 3. Fig. 5 is a detail view in side elevation of the brake device illustrated in Figs. 1 and 2. Fig. 6 is a detail view of the brake device shown in connection with Figs. 3 and 4. Fig. 7 is a detail plan view of the motor and appurtenant parts. Fig. 8 is a side elevation of the parts shown in Fig. 7. Fig. 9 is a view in elevation of the cradle for holding the motor parts, with parts broken away to illustrate the antifriction fifth wheel bearings. Fig. 10 illustrates, somewhat in diagram, a modified form of truck with a drop platform. Fig. 11 illustrates a side view of a modified form of truck in which both pair of wheels are driving-wheels. Fig. 12 is a plan view of the parts shown in Fig. 11. Fig. 13 is a diagrammatic view illustrating the wiring system.

One of the chief purposes of the present invention is to provide a truck which, while power-driven, may be controlled by an operative walking in front of or behind the truck dependent upon its direction of movement.

Referring to the drawings and particularly Figs. 1, 2, 5, 7, 8, 9 and 13, the numeral 1 denotes the body of the truck suitably mounted upon a frame 2 of any desired construction. This frame together with the fore and rear axles comprising a complete chassis. A battery or other suitable prime mover 3 is arranged preferably below the body of the truck and intermediate its supporting axles. This prime mover may be of any desired type for furnishing the requisite power to drive the truck.

At one end of the truck there is arranged and secured to the body part 1, the upper section 4 of a fifth wheel, the co-operating segment 5 of which surmounts a cradle-like frame which supports the main motor parts of the device. Intermediate the two sections of the fifth wheel are antifriction bearings 6 which permit free turning of the steering wheels 7 with reference to the upper fixed segment 4 of the fifth wheel structure.

The cradle for supporting the driving mechanism consists of side parts 8 and transverse members 9, all of which are arranged between the co-operating segment 5 of the fifth wheel and the forward axle 10 of the truck. These members may be arranged in any desired manner to properly support the driving mechanism. As shown herein, the side parts 8 support a motor 11 and form bearings for a live axle 12 which, at either end, bears pinions 13 meshing with gears 14 secured to the two wheels 15—16. Of course, the live axle 12 has interposed in it a differential gear 17 as is common practice in motor driven vehicles.

The armature-shaft 18 of the motor 11 drives the pinions 13 through the differential 17 and a pinion 19 mounted upon the said armature-shaft. By hanging the motor upon the shaft 12, the armature pinion 19, differential 17 and pinions 13 together with the gears 14 may be always held in proper meshing alinement and, it is to be noted that all of these parts are rigidly supported in the cradle over the driving axle 10 which provide practically a "fore carriage construction".

Upon the motor-shaft 18 is mounted a brake drum 20, which has a pair of brake-shoes 21—22 preferably pivoted upon an axle-hanger 23 and normally pressed against the brake-drum by a strong spring 24. These two brake shoes are connected by a link 25 and lever 26. The lever in turn is connected through an adjustable rod 27, link 28 and adjustable connection 29 with a controlling handle 30 mounted upon the main controlling handle 31 of the truck.

The controlling handle 30 through a flexible connection 32, passing about antifriction rolls 33—34, connects with the brake lever 26 through the intermediate connections above noted, and gives complete control of the brake device. The controlling lever 30 is also arranged to control the main source of power and its action upon the driving motor. A pair of contacts 35—36 are arranged to be closed by the controlling handle 30, and, obviously, whenever said handle is moved against the tension of its spring 37 to release the brake-shoes from the brake-drum 20, the circuit through the contacts 35—36 will be closed.

Referring to the wiring diagram in Fig. 13, it is obvious that a movement of the controller 30 will close the circuit through the contacts 35—36, thus connecting the battery 38 through a variable resistance 39 and the solenoid 40 of an automatic switch 41. This switch in turn connects the terminals 42—43 of the main motor circuit 50, which in turn cuts in the battery 38 directly to the coils of the motor. In the circuit 50 there is preferably arranged a reversing switch 51 by which the direction of rotation of the motor may be controlled. There is also shown in this wiring diagram a solenoid 52 which corresponds to the solenoid 52 in Figs. 3 and 4 of the drawings. This device, as hereinafter described, acts automatically through the electric circuits to control the brake device of the truck.

The parts illustrated in the wiring diagram as 39, 40, 41, 42 and 43, are illustrated in Figs. 1 and 2, as 53, and comprising an ordinary form of automatic switch which, being energized through the circuit controlled by the controlling lever 30, operates to open and close the main circuit 50 between the battery and the driving motor. Such devices being well-known and in common use, no detail description is deemed necessary other than the wiring diagram. In this diagram 39 indicates a variable resistance which may be set to effect any desired action of the current upon the plunger 54 of the solenoid 40 which controls the switch member 41 and its position with reference to the contacts 42—43.

The operation of the device thus far described and as illustrated is as follows: The operator walking either in front of or behind the truck, seizes the handle 31 and by pulling upon the controlling handle 30, releases the brake-shoes 21—22 from the brake-drum 20. Just after this release the circuit is closed through the contacts 35—36, the controller 30 acting as the main switch. This energizes the solenoid of the automatic switch and closes the main circuit from the battery through the contacts 42—43, effecting a direct connection for the motor circuit 50. The vehicle or truck will be driven either forward or backward dependent upon the position of the reversing switch 51, which may be of any desired sort and placed in any convenient position with reference to the operator. This is not shown in Figs. 1 and 2.

In Figs. 3 and 4, the parts are substantially the same as above described in connection with Figs. 1 and 2, the only substantial difference being in the automatic power control of the brake.

Referring particularly to Figs. 3, 4 and 6, there is shown in addition to the parts above mentioned and in place of the manually actuated brake, the solenoid 52 which is arranged in the main motor circuit and controlled by a controlling handle 55, normally retracted by a spring 56 and provided with a thumb-piece by which it may be pulled forward upon the main controlling handle 57 until it effects a closure of a switch having contacts 58—59. These contacts correspond to the switch contacts heretofore described as 35—36. When the circuit is closed through these contacts, the solenoid 52 is energized and through its core $58^a$, connected by links $59^a$ 60, and shaft 61, with the brake lever 62, releases the brake-shoes 63—64 from the brake-drum 65. The brake-shoes are normally held in contact with the brake-drum by a spring 66, and are released upon the application of power to the driving motor. In this form of the device there is also provided a manually operated brake-lever 67, provided with a pawl 68, which slides over toothed segment 69, and may be set to any desired degree of tension. This arrangement permits setting the brake either on or off irrespective of the action of the solenoid.

In Fig. 10 there is shown what is commonly known as a drop truck, in which there is a depressed truck base 70, the battery or other source of power 71, being arranged at the forward end over the driving-wheels 72. The driving mechanism in this instance, is substantially the same as that heretofore described, there being simply a different arrangement of parts to permit a particular form of vehicle for special purposes.

In Figs. 11 and 12 there is illustrated a mechanism in which the driving motor 73 is arranged intermediate the fore and rear axles, and through chain connections 74, bevel-pinion 75, differential 76 and shaft 77, transmits its power through pinions 78 to gears 79 mounted upon the rear axle. It is also provided with a chain drive 80, bevel-pinion 81 meshing with differential 82 upon a shaft 83, and driving the forward wheels through gears 84 and pinions 85, the latter borne on a shaft 83. In this form of the device there are two fifth wheels, one for each axle, and thus the truck may be turned within a shorter radius enabling quick and certain manipulation in close quarters.

Whether the device is applied as shown in Figs. 1 to 9, or in Figs. 10 and 12, the control is substantially the same. The truck is absolutely under the control of the operator who, either manually or automatically, applies and releases the brake as he simultaneously controls the effect of the main source of power upon the driving motor.

Obviously various changes as to detail might be made without departing from the spirit or scope of the invention, which contemplates a baggage truck controlled by an operator walking either before or behind said truck.

What I claim as my invention and desire to secure by Letters Patent is:—

1. In combination in a motor truck, an axle, combined driving and steering wheels mounted upon the axle, a main source of energy, translating device actuated by said main source of energy for driving the wheels, said device supported by, and movable with, the axle in its steering movements, a combined draft and steering handle connected with said axle, and means appurtenant thereto for controlling the main source of energy and its action upon the translating devices.

2. In combination in a motor truck, driving and steering wheels, a main source of energy, translating devices actuated by said main source of energy for driving the truck, a combined draft and steering handle, means appurtenant thereto for controlling the main source of energy and its action upon the translating devices, and a brake device normally in braking position and controlled by the controller appurtenant to the steering handle.

3. In combination in a truck, driving and steering wheels, a body mounted thereon, a main source of energy carried by the body, a motor actuated by said main source of energy for driving the truck, a combined draft and steering handle, means appurtenant to said handle for controlling the action of the main source of power with reference to the motors, a brake device normally preventing movement of the truck, and mechanical means intermediate the power controller and brake device for releasing the latter upon an application of the power.

4. In combination in a truck, driving and steering wheels, a body mounted thereon, a main source of energy carried by the body, a motor actuated by said main source of energy for driving the truck, a combined draft and steering handle, means appurtenant to said handle for controlling the action of the main source of power with reference to the motors, a brake device normally preventing movement of the truck, and automatically actuated power controlled means for releasing the brake device simultaneously with the application of the power.

5. In combination in a truck having forward and rear wheels and axles therefor, a cradle supported upon the forward axle, a motor hung in said cradle and provided with a brake drum, said motor geared to wheels, an anti-friction fifth wheel surmounting said cradle and upon which the axles, wheels and cradle is turned, a combined draft and steering handle connected with said axle, a controlling device for the motor mounted thereon, and connections between said controlling device and brake device for actuating the latter simultaneously with the control of the former.

6. In combination in a motor truck, driving and steering wheels, a main source of energy, translating devices actuated by said main source of energy for driving the truck, a combined draft and steering handle, means appurtenant thereto for controlling the main source of energy and its action upon the translating devices, and a brake controlled by the controller appurtenant to the steering handle.

7. In combination in a motor truck, driving and steering wheels, a body mounted thereon, a main source of energy carried by the body, a motor actuated by said main source of energy, for driving the truck, a combined steering and draft handle, means appurtenant to said handle for controlling the action of the main source of power with reference to the motor, a brake device, and automatic means for actuating said brake device, said automatic means controlled from the combined draft and steering handle.

WILLIAM P. KENNEDY.

Witnesses:
 EDWIN S. MERRILL,
 ANNA M. STAPLETON.